United States Patent [19]

Wang

[11] 4,275,561
[45] Jun. 30, 1981

[54] ENERGY CONVERSION SYSTEM

[76] Inventor: Frederick E. Wang, 11816 Caplinger Rd., Silver Spring, Md. 20904

[21] Appl. No.: 930,701

[22] Filed: Aug. 3, 1978

[51] Int. Cl.³ .............................................. F03G 7/06
[52] U.S. Cl. ..................................................... 60/527
[58] Field of Search ................................... 60/527–529

[56] References Cited

U.S. PATENT DOCUMENTS

| | | | |
|---|---|---|---|
| 4,010,612 | 3/1977 | Sandoval | 60/527 |
| 4,055,955 | 11/1977 | Johnson | 60/527 |
| 4,075,846 | 2/1978 | Li | 60/527 |
| 4,117,680 | 10/1978 | Smith | 60/527 |

OTHER PUBLICATIONS

*Journal of Applied Physics*, vol. 43, No. 1, Jan. 1972, p. 92, F. E. Wang, "Transformation Twinning of B2 (CsCl)-Type Structure Based on an Inhomogeneous Shear Model".

*Primary Examiner*—Allen M. Ostrager
*Assistant Examiner*—Stephen F. Husar
*Attorney, Agent, or Firm*—Craig & Antonelli

[57] ABSTRACT

A thermal-mechanical energy converting device with at least two rotatably supported wheels and with one or more endless transmission elements of a material having a memory effect capable in the bending mode of converting thermal energy into mechanical energy when heated from a temperature below its transition temperature to a temperature above its transition temperature; the transmission elements serve to drive one wheel from the other wheel upon application of thermal energy to the transmission elements, whereby the thermal energy is transferred from the other wheel to the transmission elements over at least a major portion of the circumferential contact of the transmission elements with the other wheel.

38 Claims, 13 Drawing Figures

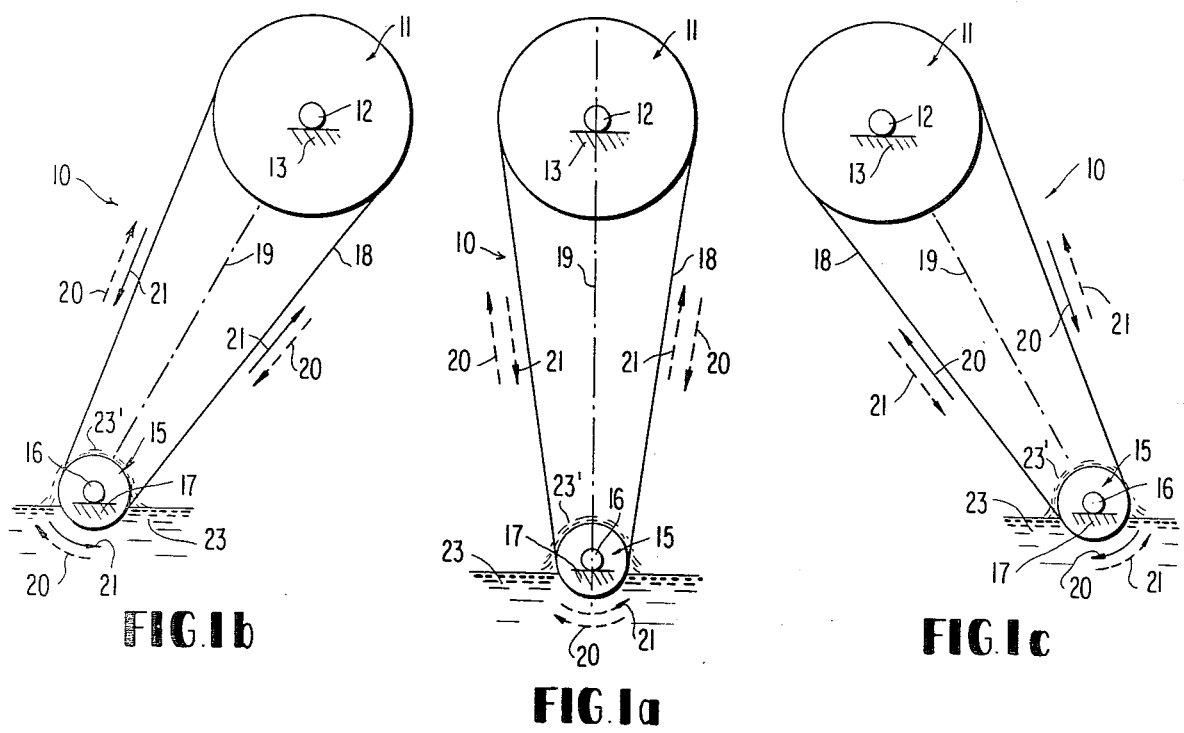
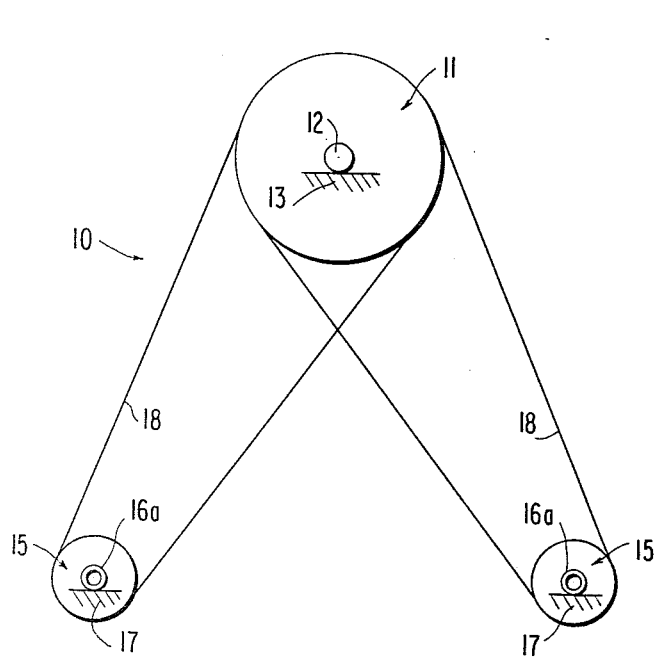
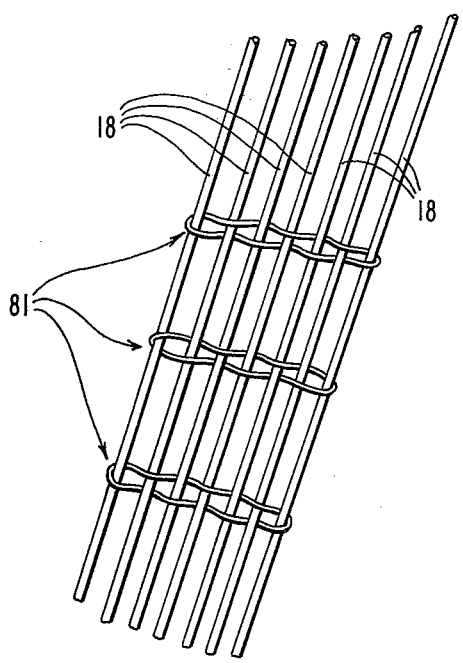

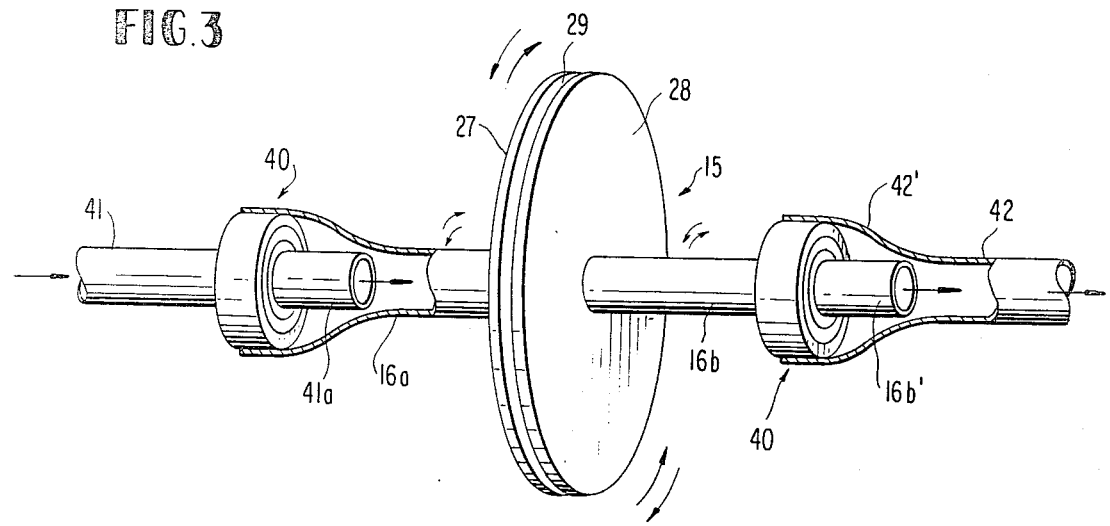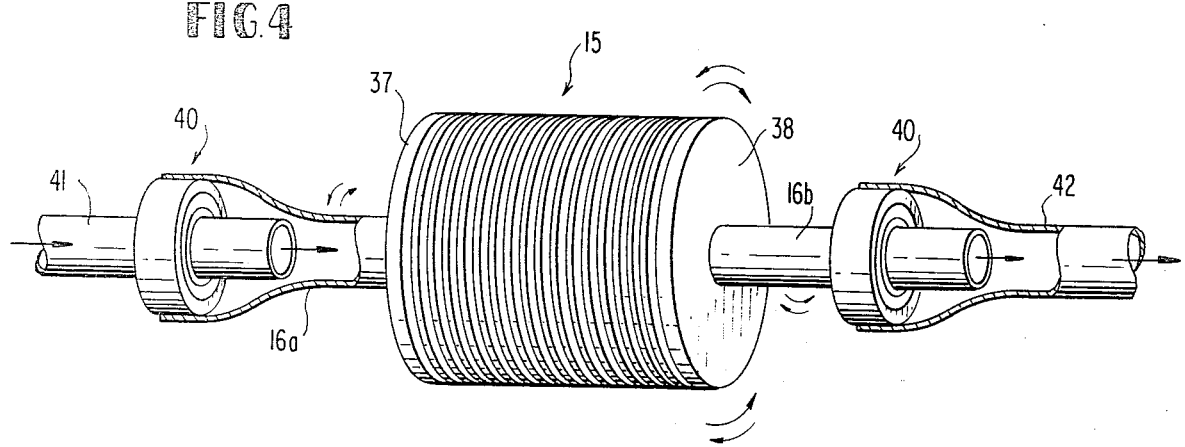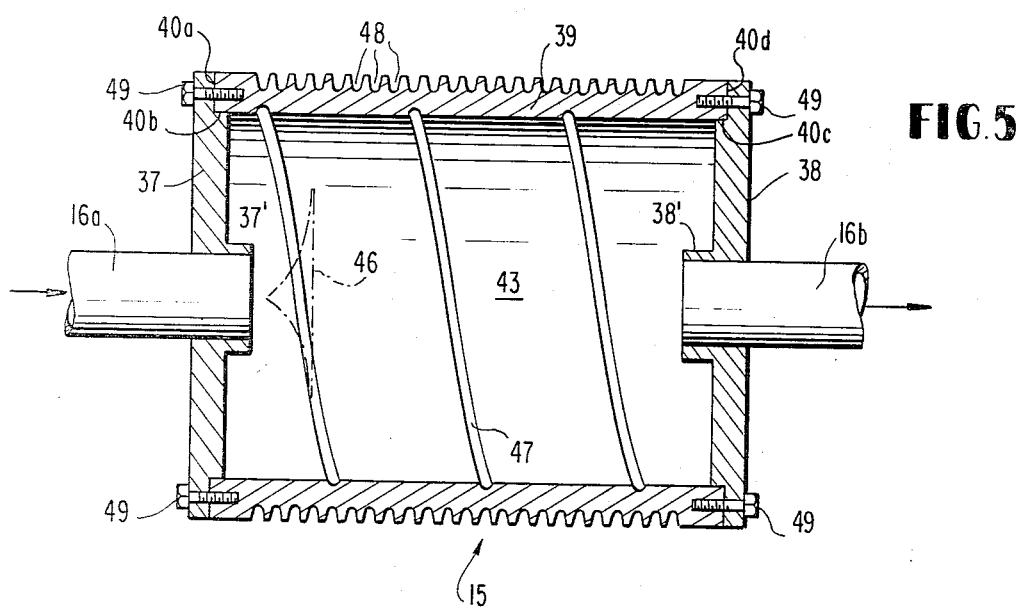

ENERGY CONVERSION SYSTEM

The present invention relates to an energy conversion system, and more particularly to a thermal-mechanical device utilizing a material having a memory effect.

PRIOR ART

NITINOL, a near stoichiometric nickel-titanium alloy as disclosed in the U.S. Pat. No. 3,174,851, exhibits a "memory effect" in various forms by heating the alloy from a temperature below its transition temperature range (TTR) to a temperature above its transition temperature range. Basically, there are two principal ways in which this NITINOL memory effect and its associated force can be used, namely in the unidirectional mode to cause the elongated material to contract and in the bending mode to cause the bent material to regain its original shape. While the unidirectional mode may be considered a more efficient way to utilize the NITINOL memory effect, it entails certain complexities. On the other hand, the bending mode offers simplicity which is of definite advantage, especially in connection with the conversion of low-grade energy where efficiency is not the primary consideration.

The possibility of utilizing this "memory" to convert heat energy into mechanical energy has also been recognized in the prior art (U.S. Pat. No. 3,403,238). Since a significant amount of force is associated with the memory effect of the NITINOL material, a number of devices have been proposed in the prior art, some of which have actually been constructed, to utilize this unique thermal-force associated therewith. However, while these prior art proposals indicated the potential of the NITINOL material for such energy conversion, none offered a practical solution capable of producing sufficient power coupled with simplicity in design and operation.

For example, the Banks engine (U.S. Pat. No. 3,913,326) utilizes a number of NITINOL elements which are alternately heated and cooled by passing the same through vessels in water at temperatures above and below the transition temperature, and which thereby impart rotation to the entire assembly when heated above the transition temperature by applying pressure against eccentrically disposed rings. Apart from the fact that the device disclosed in this patent is relatively complicated in structure, it also entails serious limitations as regards the need for careful adjustment and the power output obtainable thereby. The thermal energy converting device disclosed in the U.S. Pat. No. 4,037,411 which utilizes flat strips cooperating with cam surfaces entails similar shortcomings as the Banks' engine since it still requires a relatively complicated construction and assembly of the various parts thereof to obtain a thermal energy conversion involving relatively small power. The use of elongated elements of NITINOL material to drive a crankshaft or swash-plate-like machine is disclosed in U.S. Pat. No. 3,937,019. However, apart from structural complexities, such as the requirement for valves, control means for the valves, etc., this arrangement is of questionable utility in practice to obtain significant amounts of power. The U.S. Pat. No. 4,075,846, operating on the unidirectional mode, utilizes a NITINOL belt in conjunction with a structure including rollers driven at differing speeds to thereby stretch the belt and therewith to produce a torque when subjected to thermal energy above the transition temperature. Apart from the fact that belts, as will be explained more fully hereinafter, are less suitable for efficiently converting thermal energy into mechanical energy, this arrangement is also relatively complicated from a mechanical point of view. The U.S. Pat. No. 4,055,955 also utilizes a tension differential between wires of NITINOL material to produce mechanical work when heated above the transition temperature. Again, the arrangement is relatively complicated and thus of questionable practical use. The heat engine disclosed in U.S. Pat. No. 4,027,479 utilizes a NITINOL transmission belt to interconnect massive magnetic elements to be subjected to a magnetic filed. The engine disclosed in this patent which relies on expansion and contraction of the NITINOL material, not only requires electromagnetic fields to act on the massive magnetic elements for proper operation thereof, but also involves a structure that is relatively complicated and cumbersome, thereby impairing its application in practice.

All of the foregoing prior art proposals, though indicating the potential of the NITINOL material for thermal energy conversion, proved of little success to date in the attempt to put the same to practical use due at least to a large degree to the structural complexities of the proposed devices and/or their inability to obtain sufficient power for practical applications.

A thermal motor, which at first glance appears more simple, is disclosed in the U.S. Pat. Nos. 4,010,612 and 4,030,298. However, the thermal motor disclosed in these two patents is also of questionable usefulness for several reasons. Firstly, the patent discloses an external source of heat to locally apply the stimulus, i.e., the thermal energy to the NITINOL belt. However, such local external heat source causes early degradation and fatigue of the belt material, in addition to poor performance of the device as a whole. This phenomenon is even more pronounced if a hot medium such as a hot gas is used to apply the stimulus, apparently predicated on the patentee's assumption that a temperature increase, increases the efficiency of his motor. This is so as the high temperatures brought about by such heating gas accelerate the degradation to the point where a permanent degradation is likely to set in. Furthermore, belts are obtained by rolling the NITINOL material in sheet form, thereby causing the twinning axes to become oriented at random in the material due to the rolling action. On the other hand, the existence of random oriented twinning axes accelerate the degradation and fatigue of the belt material. To avoid this problem, these two prior art patents propose an arrangement to take the permanent set out of the belt by passing the belt on opposite sides of a number of pulleys and by applying a stimulus to each pulley. On the other hand, a multiple pulley arrangement, as suggested by the patents increases the complexity of the overall motor since power from different pulleys would have to be transmitted to a common shaft, for example, by gearings or the like in order to obtain a useful output. Furthermore, due to the multiple heat sources, the combined heat losses would render such device unacceptable for all practical purposes. Finally, the device proposed in these two patents is inoperable with a symmetrical application of the thermal energy, thereby precluding a simple design, in contrast to the present invention, which is capable of producing substantial power outputs by extremely simple means.

The U.S. Pat. No. 4,117,680 to Smith relates to a continuous loop shape memory effect heat engine in which the band is impressed with a circular shape so that it will tend to return abruptly to the circular shape. In the actual embodiments of FIGS. 2 and 3 of this patent, a complex looped arrangement of the band is used in which the heated portion of the band tends to return to a curved wall, thereby imparting rotation to the driven shaft.

SUMMARY OF THE INVENTION

The present invention is therefore concerned with the task to avoid the aforementioned shortcomings and drawbacks encountered with the prior art thermal-mechanical devices utilizing a material with memory effect, and more particularly is concerned with the provision of a thermal-mechanical device operating in the bending mode which will permit the conversion of low-grade heat energy into relatively large power outputs by structural means that are both simple and reliable in operation.

The underlying problems are solved according to the present invention in that a memory effect material such as NITINOL wire is used in the bending mode by bending it about the relatively hotter wheel which is at a temperature above the TTR of the memory effect material and in that thermal energy is transferred from the relatively hotter wheel to the wire over at least a major portion of the circumferential contact of the memory material with the relatively hotter wheel. Preferably, a memory effect material is used as transmission element whose twinning axes are aligned at least substantially uniaxially. For example, the NITINOL material in the form of a wire or similar configuration may be extruded so that the twinning axes of the extruded NITINOL wire become aligned uniaxially. However, other means may be used to obtain a memory effect with uniaxially aligned twinning axes. For example, the memory effect material may be continuously cast and made in appropriate shape as disclosed in the U.S. Pat. No. 3,985,177. It has been surprisingly found that by applying the thermal energy to the NITINOL transmission element from the wheel itself which has a temperature above the TTR of the memory effect material, a thermo-mechanical device can be obtained which is simple in construction, has no preferred direction of rotation, and can be utilized to obtain substantial power outputs without any danger of fatigue or degradation of the material. In addition thereto, a wire-like material which poses no slippage problems in a thermal-mechanical device according to the present invention, is superior to a belt material due to the greater surface for a given volume of the material, thereby assuring a more rapid heating and cooling under identical conditions. Additionally, the present invention permits a substantial increase in power output by the possibility of using a large number of wires in a given device of limited space.

Since the device according to the present invention utilizes the hotter wheel as source of thermal energy for the memory effect material of the transmission element and as a result thereof has no preferential direction of operation, in contrast to the device disclosed in the U.S. Pat. No. 4,010,612, it is possible to utilize a "hot wheel," i.e. a wheel having a substantially uniform temperature throughout or at least along its circumferential surface in contact with the memory effect material, which wheel is hollow on the inside to permit the flow therethrough of a heated fluid medium, thereby not only greatly facilitating the construction and sealing problems but also increasing the efficiency of the device. This is possible according to the present invention, even though such "hot" wheel rotating at relatively high speed, has substantially the same temperature throughout its entire structure—a characteristic completely rejected as not feasible in the U.S. Pat. No. 4,010,612—since the device in accordance with the presentinvention exhibits no preferred direction of rotation and will continue to rotate once set into rotation in a given direction. Moreover, any problem which may arise due to randomly oriented twinning axes of a belt-like material tending to cancel out the driving effect as a result of an internal shifting of the twinning axes at the point where the heat is locally externally applied to assume a position of least resistance to bending (i.e. a position perpendicular to the direction of movement of the belt), can be readily eliminated by the present invention.

According to another feature of the present invention, the "hot" wheel through which the heated medium will flow may be provided with appropriate baffle means or the like to direct the fluid medium radially outwardly, thereby further enhancing the transfer of thermal energy to the circumferential surfaces of the wheel which are in contact with the NITINOL transmission element or elements. Additionally, the "hot" wheel may also include some suitable means, for example, in the form of a propeller-like device within the cavity thereof, possibly combined with the baffle structure, to impart a preferred direction of rotation to the wheel by the flow of the heating medium therethrough.

In a preferred embodiment of the present invention, only two wheels are used, each having a predetermined axial length to accommodate a certain number of axially spaced NITINOL wires, whereby the larger, relatively cooler wheel is drivingly connected with the output shaft while the smaller one of the two wheels which is hollow and forms a "hot" wheel is supported on a hollow shaft; the hollow shaft itself is rotatably supported in sealed bearings to provide a rotatable, sealed connection between a stationary tubular element serving as input pipe and output pipe and the rotating input and output sections formed by the hollow shaft. The larger wheel may thereby be provided with suitable means to increase the frictional contact between the NITINOL transmission element(s) and the circumferential surface of the larger wheel in contact with the NITINOL transmission element(s), which is driven thereby.

Since a number of "hot" wheels may be used, axially connected in series, it is also possible to utilize with consecutive hot wheels, transmission elements of memory effect material, the transition temperatures of which decrease in the direction of flow of the fluid medium to take into consideration the decrease in temperature of the fluid medium as it passes through the series-connected "hot" wheels. The TTR of the NITINOL material can be readily controlled, for example, by the admixture of certain materials such as iron, cobalt, etc. to the binary nickel-titanium alloy, as disclosed, for example, in the U.S. Pat. No. 3,558,369.

In another embodiment of the present invention, a number of smaller or "hot" wheels mutually offset in the axial direction cooperate with a single larger, relatively colder wheel of essentially equal axial length as the total axial length of the axially offset smaller or "hot" wheels are arranged about the larger wheel and are connected therewith by way of at least one endless transmission means each in the form of a NITINOL wire or the like. The larger wheel may thereby be provided with means to increase the frictional contact between its peripheral surface and the NITINOL wires while the smaller wheels may be constructed as "hot" wheels, as described above, or may be constructed as smaller wheels rotatably supported in a channel or channels, through which flows the heated fluid medium.

Accordingly, it is an object of the present invention to provide a thermal-mechanical device for converting thermal energy into mechanical energy by the use of a memory effect material operating in the bending mode which avoids by simple means the aforementioned shortcomings and drawbacks encountered in the prior art.

Another object of the present invention resides in a thermal-mechanical device for converting thermal energy into mechanical energy, which is extremely simple in construction, yet permits the attainment of substantial power outputs with the use of low-grade energy.

A further object of the present invention resides in a thermal-mechanical device for converting thermal energy into mechanical energy which is particularly suitable for applications using low-grade heat energy, such as available, for example, from solar energy, from the waste heat produced by internal combustion engines, by steam turbines, and by nuclear power plants, from temperature differences in the ocean etc.

A still further object of the present invention resides in a thermal-mechanical device for converting low-grade heat energy into substantial mechanical power outputs without the need of complicated structures and/or expensive controls therefor.

Another object of the present invention resides in a thermal-mechanical device of the type mentioned hereinabove which exhibits no preferred direction of rotation.

Still another object of the present invention resides in a thermal-mechanical device for converting thermal energy into mechanical energy which permits an efficient use of the thermal energy contained in fluid media.

A further object of the present invention resides in a thermal-mechanical device for converting thermal energy into mechanical energy which is characterized by compact design and great versatility in its applications.

These and other objects, features and advantages of the present invention will become more apparent from the following description when taken in connection with the accompanying drawing which shows, for purposes of illustration only, several embodiments in accordance with the present invention, and wherein:

FIGS. 1a, 1b and 1c are schematic views illustrating the principle of operation of a thermal-mechanical device in accordance with the present invention;

FIG. 2 is a schematic view of one embodiment of a thermal-mechanical device in accordance with the present invention utilizing so-called "hot" wheels;

FIG. 3 is a somewhat schematic perspective view of one embodiment of a "hot" wheel and its sealed bearing support for use with a single memory-effect transmission element in a thermal-mechanical device according to the present invention;

FIG. 4 is a somewhat schematic perspective view of another embodiment of a "hot" wheel and its sealed bearing support for use with multiple transmission elements having a memory effect characteristic in a thermal-mechanical device according to the present invention;

FIG. 5 is an axial cross-sectional view through the "hot" wheel of FIG. 4;

Figure 10:
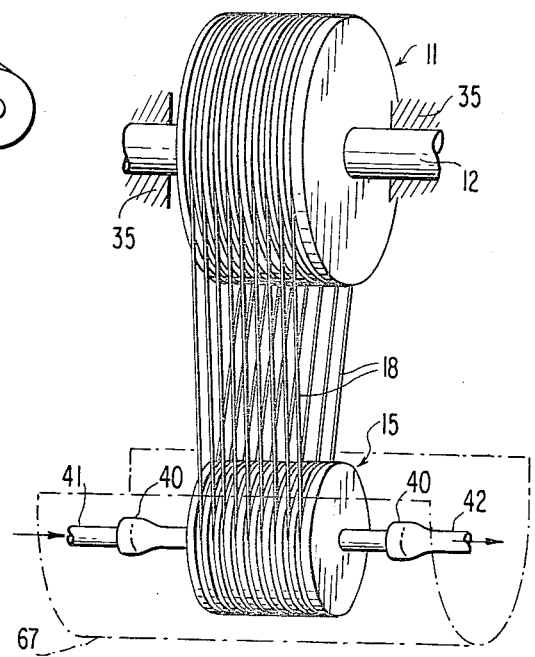

FIG. 10 is a somewhat schematic perspective view of a preferred embodiment of a thermal-mechanical device in accordance with the present invention utilizing only two wheels drivingly interconnected by a large number of transmission elements having a memory effect characteristic; and FIG. 11 is a side view of a web-like construction of several transmission elements for the energy conversion system in accordance with the present invention.

Referring now to the drawing wherein like reference numerals are used throughout the various views to designate like parts, and more particularly to FIGS. 1a, 1b and 1c, these figures illustrate the principle of operation of a thermal-mechanical energy-converting device in accordance with the present invention, generally designated by reference numeral 10, which comprises a first, relatively larger wheel generally designated by reference numeral 11 supported on and rotatable with a shaft 12 forming an output shaft, itself rotatably supported by suitable bearings or the like (not shown) in a fixed support, schematically designated in these figures by reference numeral 13. A second, relatively smaller wheel generally designated by reference numeral 15, 15', and 15" (FIGS. 1a, 1b and 1c), having a relatively smaller diameter than the wheel 11, is mounted on a shaft 16 which is again rotatably supported in a fixed support, schematically illustrated in these figures and designated therein by reference numeral 17. The wheel 15(15' or 15") is drivingly connected with wheel 11 by way of one or several transmission elements 18 of a material having a memory effect, preferably of NITINOL material of suitable configuration. In each of FIGS. 1a, 1b and 1c, reference numeral 23 designates a fluid medium, used to transfer thermal energy to the relatively smaller wheel 15, 15' or 15". The temperature of the fluid medium 23 is above the transition temperature of the transmission element or elements 18 used in the thermal-mechanical energy device of the present invention.

Assuming that the original shape of the NITINOL transmission element or elements 18 is straight, the latter will be bent as they extend about a portion of the circumference of the smaller wheel 15 (15' or 15"). As heat is applied to the transmission element or elements 18, the latter will tend to straighten out by unbending, with the release of a mechanical force.

With the wheels 11 and 15, disposed one above the other as shown in FIG. 1a, and with the application of thermal energy to the transmission element or elements 18 by way of the smaller wheel 15 substantially symmetrically with respect to the plane of symmetry 19, the transmission element or elements 18 will remain stationary. This is due to the fact that the forces produced by the application of thermal energy to the transmission element or elements 18 by the wheel 15 will tend to cancel one another as a result of the symmetric application of the thermal energy, i.e., as a result of a substantially similar length of contact of the transmission element or elements 18 with the circumferential surface of the wheel 15 on both sides of the plane of symmetry 19. On the other hand, notwithstanding this symmetrical application of thermal energy, the device will rotate in either direction of rotation as indicated by dash arrows 20 and 21 if the device is set to rotate in a given direction. In other words, the thermal-mechanical energy device 10 of FIG. 1a will continue to rotate in the clockwise direction of arrow 20 if given an impetus in this direction while heat is transferred from the wheel 15 to the transmission element or elements 18 in the manner shown in FIG. 1a. Similarly, if an impetus is applied to the transmission element or elements 18 in the counterclockwise direction of rotation indicated by arrow 21, the thermal-mechanical energy device 10 of the present invention as illustrated in FIG. 1a will continue to rotate in this direction notwithstanding the symmetrical application of thermal energy.

The full line arrow 21 of FIG. 1b illustrates the direction of rotation if a stationary thermal-mechanical energy device 10 approaches the heat source, as shown in FIG. 1b, in which the application of the thermal energy to the wheel 15' is asymmetrical in relation to the plane 19. On the other hand, if the device 10 of FIG. 1b is already rotating in the direction indicated by the dash arrow 20 or if an impetus is given to the thermal-mechanical energy device 10 of this figure in the direction of dash arrow 20 at the time thermal energy is applied to the transmission element or elements 18, the thermal-mechanical energy device of this figure will continue to rotate in this direction of rotation. The reverse is true in the position of the parts illustrated in FIG. 1c, i.e., if a stationary thermal-mechanical energy device 10 approaches the heat source, it would normally result in a direction of rotation of arrow 20. Notwithstanding the asymmetric application of thermal energy to the transmission element or elements 18 in FIG. 1c, the transmission element or elements 18 would nonetheless continue to rotate in the direction of arrow 21 if at the time thermal energy is applied thereto, the device 10 rotates in that direction or is given an impetus to rotate in the direction of arrow 21.

Thus, the present invention is predicated on the discovery that the wheel 15, 15' or 15", if set into rotation in the clockwise or counterclockwise direction, will continue to rotate in such direction whether in the position of FIG. 1b or 1c or whether returned to the position in FIG. 1a. As a matter of fact, the thermal-mechanical energy device 10 of the present invention will continue to rotate in the direction of arrow 21 even if displaced from the position in FIG. 1b through the position in FIG. 1a to the position of FIG. 1c. This is due to the fact that the thermal energy is transferred from the wheel 15 to the NITINOL transmission element or elements 18 at least to a large extent because the wheel 15 will assume a substantially constant temperature as a result of the relative fast rotation thereof even if the heated fluid medium comes in contact only with part of its circumference. Moreover, if, for example, the heated medium is a liquid such as water, then a film 23' of hot water taken along the circumference of the wheel 15 contributes to the uniformity of the temperature throughout the entire wheel or at least throughout the entire circumference thereof. Thus, thermal energy is transferred from the wheel 15, 15' and 15" to the transmission element or elements 18 over at least a major portion of the circumferential contact of the transmission element or elements 18 with the respective wheel. It has been surprisingly found that substantial amounts of power can be realized by an arrangement as shown in FIGS. 1a, 1b and 1c, utilizing several wires of NITINOL material which is believed due to the fact that the thermal energy is transferred from the relatively hotter wheel 15 to the transmission element or elements 18 over a substantial portion of the circumferential contact of the transmission element or elements 18 with the wheel 15, which itself is heated by the thermal energy in the liquid or gaseous medium in contact with external and/or internal surfaces of the wheel 15.

In order to maximize the torque and forces obtainable from the output shaft 12, which is driven by the transmission element or elements 18 by way of the wheel 11, it is desirable that the bent portion of the transmission element or elements, i.e., the portion bent around the wheel 15 has a relatively small radius of curvature to increase the force associated with the unbending of each transmission element upon application of thermal energy thereto. On the other hand, the transmission element 18 which just loses its contact with the circumference of the wheel 15, is relatively stiff, whence the wheel 11 should be relatively large in order to accommodate the stiffness of the transmission element, i.e., its resistance to bending around the wheel 11. Another aspect to consider, in an effort to maximize the output obtainable with the device in accordance with the present invention, is the avoidance of slippage between the wheel 11 and the transmission element or elements 18. On the other hand, the slippage problem of the transmission element or elements 18 in relation to the wheel 15 is of lesser consideration since the primary purpose of the wheel 15 is to provide, on the one hand, the necessary bending and, on the other, to assist in transferring thermal energy to the transmission element or elements 18. For that reason, the circumferential portion of the wheel 15, if not the entire wheel, should be made of a material with good heat-conducting properties, i.e., of a material that readily transfers thermal energy from the wheel 15 to the transmission element or elements 18.

The thermal energy contained in the fluid medium may be applied to the wheel 15, 15', 15" of FIGS. 1a, 1b and 1c in any suitable manner, for example, by conducting the fluid medium externally past a portion of the wheel 15 by the use of suitable ducts, channels or tanks. However, any other means may also be utilized to transfer the thermal energy from the fluid medium 23 to the wheel 15. Additionally, the wheels 11 and 15 may be supported relative to one another by a suitable link-like structure in such a manner as to automatically take up slackening or tightening of the transmission element or elements 18. This may be accomplished, for example, by the use of a suitable number of pairs of links pivotally connected to the shafts 12 and 16 on both sides of the wheels 11 and 15 and suitably pivotally interconnected with each other. Moreover, since the relatively smaller wheel 15 is intended only to transfer thermal energy to the transmission element or elements 18, it is also possible to rotatably mount the same on the shaft 16 by the use of appropriate bearings directly therebetween.

Since, as pointed out in connection with FIGS. 1a, 1b and 1c, the small wheel 15, once set into rotation in one direction, will continue to rotate in such direction of rotation, driven by the transmission element or elements 18, even though the wheel 15 is returned to its symmetric position of FIG. 1a, and since tests have demonstrated that the device according to the present invention will work even when thermal energy is transferred from the smaller wheel 15 to the transmission element or elements 18 when the wheel 15 has a uniform temperature throughout, which it reaches as a result of the rapid rotation notwithstanding its only partial immersion into the fluid medium 23, it has been surprisingly discovered that the thermal-mechanical energy device according to the present invention will also operate with a so-called "hot" wheel, i.e., with a wheel which is intentionally made relatively hot—of a temperature above the TTR of the transmission elements—and of uniform temperature throughout at least its entire circumferential surface. FIG. 2 schematically illustrates the principle of operation of a thermal-mechanical energy device 10 in accordance with the present invention utilizing two so-called "hot" wheels 15. More specifically, the thermal-mechanical energy device of FIG. 2 includes a relatively colder, larger wheel 11 mounted on a shaft 12 for rotation in unison therewith which is again suitably rotatably supported in a relatively fixed part 13 by the use of appropriate bearings or the like (not shown). The two "hot" wheels 15 which are supported on hollow shafts 16a, themselves rotatably supported by the use of suitable bearings in relatively fixed parts 17, are drivingly connected each with the wheel 11 by way of one or several NITINOL transmission elements 18. To avoid interference between the transmission elements 18 of the two wheels 15, the latter are offset in the axial direction relative to one another and the wheel 11 is thereby made of an axial length effectively corresponding to the total axial length of the two axially offset wheels 15. Since the present invention will permit a hot wheel 15 which has substantially uniform temperature throughout, it is possible to pass the fluid medium containing the thermal-energy into and out of the cavity provided inside of the "hot" wheel 15 through opposite sides of the shaft 16a to transfer thermal energy to the wheels 15 internally thereof. While two "hot" wheels 15 are shown in FIG. 2, this is only to illustrate the possible arrangement of the "hot" wheels about the colder wheel 11. In practice, of course, only a single "hot" wheel 15 or a large number of "hot" wheels spaced about the wheel 11 may be utilized which is or are each drivingly connected with the colder wheel 11 by way of one or preferably a large number of NITINOL transmission elements 18. The discovery of the possible use of a so-called "hot" wheel has, in fact, opened up numerous applications in closed systems and/or restricted space conditions which heretofore were important factors that could not be adequately satisfied. Though reference is made herein to so-called "hot" wheels, it should be understood that the actual temperature of the wheels 15 depends on the temperature of the fluid medium to which the NITINOL transmission elements 18 are suitably matched so that the fluid medium temperature is above the transition temperature of these elements 18.

FIG. 3 illustrates somewhat schematically an arrangement of a so-called "hot" wheel 15 for use with a single transmission element, which consists of two disk-like side elements 27 and 28 interconnected by a circumferential part 29 of suitable axial length to accommodate a NITINOL transmission element (not shown in the thus-formed U-shaped channel).

If the fluid medium is clean, the shaft sections 16a and 16b as also the wheel 15 may be constructed hollow, so that the gaseous or liquid fluid medium containing the thermal energy can flow from the inlet shaft section 16a into the cavity formed inside the wheel 15 and out of this cavity through the outlet shaft section 16b. Sealed bearings of conventional construction, generally designated by reference numeral 40 (FIG. 3) thereby rotatably support the hollow shaft sections 16a and 16b in tubular input and output members 41 and 42. In order to minimize the fluid loads on the bearings 40, the input member 41 extends with a short pipe section 41a into the tubular shaft section 16a which, for that purpose, is flared at 16a' to the outer diameter of the bearing 40. For similar reasons the output shaft section 16b extends with a short pipe section 16b' beyond the other side of the sealed bearing, whereby the output member 42 is flared at 42' to the outer diametric dimension of the sealed bearing 40.

Of course, the "hot" wheel of FIG. 3 may also be used in an arrangement in which thermal energy is transferred thereto externally. The choice between external or internal heat transfer depends to a large extent on the cleanliness of the fluid medium since non-clean fluid media containing, for example, contaminants or impurities or foreign particles or parts, which would threaten to clog up the internal heat transfer system, must be relegated to arrangements with external heat transfer to the wheels 15.

Moreover, the arrangement of FIG. 3 is also particularly suitable in installations where a number of wheels 15, each permitted to rotate freely relative to the other wheels 15, is individually connected by one transmission element with a single colder wheel 11 of appropriate axial length to accommodate the corresponding number of transmission elements. In an arrangement with internal heat transfer, this can be readily achieved by connecting a number of hot wheels 15 in series by way of sealed bearings. However, such an arrangement becomes particularly simple in case of external heat transfer since in that case it is only necessary to rotatably mount the wheels 15 coaxially arranged on a single shaft 16 possibly by the interposition of suitable anti-friction bearings.

FIGS. 4 and 5 illustrate somewhat schematically a relatively hot wheel 15 for use with multiple NITINOL transmission elements 18 between a single relatively hot wheel 15 and, for example, a single relatively cold wheel 11. The hot wheel 15 of FIGS. 4 and 5 consists again of disk-like end members 37 and 38 interconnected by a circumferential member 39 of substantial axial length. The circumferential member 39 is thereby of doubly stepped or offset configuration as indicated by the surface portions 40a, 40b, 40c and 40d so that the end members 37 and 38 which are of complementary configuration, can be suitably secured to the circumferential member 39 by threaded means schematically indicated by reference numeral 49. The hollow input and output shaft sections 16a and 16b, respectively, are rotatably supported relative to the input and output members 41 and 42 by sealed bearings 40 in a manner similar to the arrangement shown in FIG. 3. On the other hand, the free ends of the shaft sections 16a and 16b near the hot wheel 15 are supported in end members 37 and 38. In order to increase the support afforded to these shaft sections 16a and 16b which protrude only very little into the cavity 43 formed inside the "hot" wheel 15, each end member 37 and 38 is provided with a short axially inwardly extending neck portion 37' and 38' so that the length of the axial support of the wheel 15 on shaft sections 16a and 16b is effectively lengthened. The circumferential member 39 may be provided, for example, with external channel-like grooves 48 to accommodate the desired number of transmission elements drivingly connecting the "hot" wheel 15 with the relatively colder wheel 11. Of course, in lieu of the grooves 48 cut into the circumferential member 39, also suitable channels may be formed by the use of partition-like elements as shown in connection with FIG. 8. Since the "hot" wheel 15 can be of uniform temperature throughout and in order to maximize the transfer of thermal energy from the "hot" wheel 15 to the transmission elements 18, the "hot" wheel 15 is preferably made throughout of a material having good thermal conductivity properties. However, at least the circumferential member 39 should be made of such material. A baffle 46, schematically shown in dash line in FIG. 5 suitably secured (not shown) to the inside of the wheel 15, may be provided near the input end of cavity 43, which is of such shape and configuration as to enhance the flow of the fluid medium in the radially outward direction within the cavity 43 of the wheel 15. The baffle 46 may, at the same time, be combined with means to impart a preferential direction of rotation to the wheel 15 by the flow of the fluid medium, for example, by the use of a blade-like configuration on the baffle 46 itself. As a result thereof, as fluid medium, heated to a temperature above the transition temperature of the NITINOL transmission elements 18, flows-in through the inlet member 41 and inlet shaft section 16a into the cavity 43 of the wheel 15, the suitably shaped blade-like configuration of the baffle member 46 will tend to impart to the wheel 15 a preferred direction of rotation which will cause the thermal-mechanical energy device of the present invention to start to operate as soon as thermal energy is transferred from the wheel 15 to the transmission elements 18. In order to assist the axial flow of the fluid medium, especially if the latter is a liquid, notwithstanding the effect of the centrifugal forces due to the rapidly rotating wheel 15, helical grooves 47 may be provided on the inside of the circumferential member 39 (FIG. 5) to reliably guide the liquid from the left to right as viewed in FIG. 5, while the wheel 15 rotates.

Since the sealed bearings 40 in the arrangement of FIGS. 3-5 provide a water-tight connection and can also be gas-tight, the arrangements schematically shown in FIGS. 3-5 lend themselves to applications involving closed systems, such as, for example, the cooling system of internal combustion engines of motor vehicles. To enhance the heat transfer from the wheel to the transmission elements 18, the various parts of the wheel 15 should be made of a material having good thermal conductivity properties such as copper or brass or similar material. Any oxides or nitrides which have been formed on the surface of the NITINOL transmission element during its manufacturing process, should be removed for the same reason, i.e., to enhance the operating efficiency.

Figure 6:
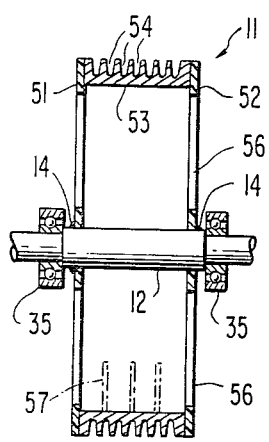
FIG. 6 is a somewhat schematic cross-sectional view through one embodiment of the relatively colder wheel in a thermal-mechanical device according to the present invention.

Though the cold wheel may be of any suitable construction, FIG. 6 illustrates in cross section one possible embodiment of a relatively colder wheel 11. The wheel 11 thereby includes two disk-like members 51 and 52 and a circumferential member 53 provided with a number of grooves 54 corresponding to the number of transmission elements 18 used to drivingly connect the wheel 11 with the "hot" wheel or wheels 15. The wheel 11 is suitably supported on or by shaft 12 in any known manner, for example, by welding or brazing the disk-like members 51 and 52 to shaft 12 in case the latter are made of metallic material, as indicated by fillets 14, or by suitably gluing or bonding the disk-like members 51 and 52 to shaft 12 by appropriate adhesive means in case the disk-like members 51 and 52 are made of plastic material. The shaft 12 is thereby rotatably supported in suitable bearings generally designated by reference numeral 35. Since the relatively cold wheel 11 must also remove as much heat from the transmission element or elements 18 as possible, it is desirable to make the relatively cold wheel 11 of a material which has good thermal conductivity properties, such as, copper, brass, etc. On the other hand, since weight also plays possibly an important role, it is also possible to make the disk-like members 51 and 52 of light-weight metal such as aluminum or of synthetic resinous material and to make exclusively the circumferential member 53 of copper, brass or the like. The disk-like members 51 and 52 are also preferably provided with windows 56 of any suitable configuration, as shown, for example, in FIG. 7, to permit the passage of air through the wheel 11 in order to remove as much thermal energy from the relatively colder wheel 11 as possible. For that purpose, it is also possible to provide any number of suitably shaped cooling ribs 57 which extend radially inwardly beyond the radially outer boundary of the windows 56. If a small fan is mounted on shaft 12 (not shown), then it is possible to blow air through the windows 56 to thereby enhance the cooling action. Even in the absence of such cooling ribs, the circumferential part 53 will be more effectively cooled if air is blown through the windows 56. Moreover, in order to increase the frictional contact of the transmission elements 18 with the surfaces of the grooves 54, suitable means may be used to increase the frictional contact therebetween. This may be done, for example, by roughening the surfaces of the grooves 34 or by coating the surfaces thereof with a suitable material.

Figure 7:
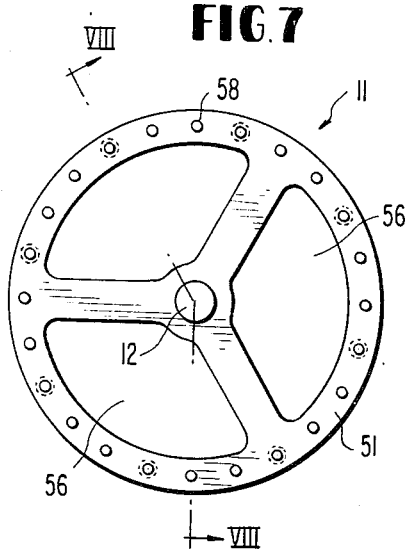
FIG. 7 is an elevational view of a modified embodiment of a relatively colder wheel in a thermal-mechanical device according to the present invention.
Figure 8:
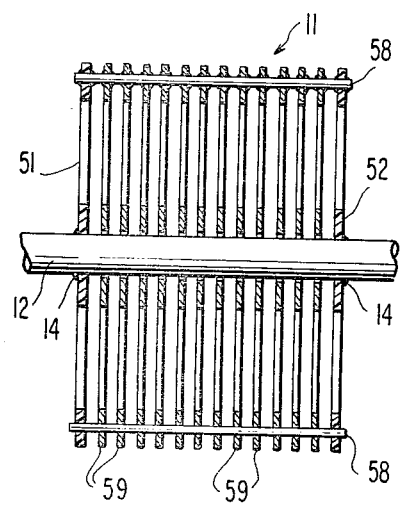
FIG. 8 is a somewhat schematic side elevational view of the relatively colder wheel of FIG. 7.

FIGS. 7 and 8 illustrate somewhat schematically a modified embodiment of a relatively cold wheel 11 which consists of two disk-like end members 51 and 52 again suitably connected without output shaft 12, as indicated by fillets 14. A predetermined number of disk-like elements 59 are provided intermediate the disk-like end members 51 and 52, which are also mounted on shaft 12, though not necessarily secured thereto. The disk-like members 51, 59 and 52 are thereby suitably interconnected by axially extending pins 58 of which, for example, each third pin 58 may be secured or bonded to the disk-like elements 51, 59 and 52. The disk-like elements 51, 59 and 52 are again provided with windows 56 to permit the flow therethrough of air, more particularly of air supplied by a small fan located to one side of the wheel 11. The construction of the wheel 11 as shown in FIGS. 7 and 8, utilizing a number of circumferentially shaped pins 58 automatically increases the frictional contact of the transmission elements 18 with the wheel 11 since the transmission elements 18 tend to be angularly bent about each pin 58. Consequently, the number of pins 58 may be suitably chosen to provide optimum frictional contact with a given wheel diameter and cross section of the transmission elements 18. In lieu of the arrangement as shown in FIGS. 7 and 8 or in FIG. 6, it is also possible to interconnect two disk-like members with each other by a number of small web-like members having suitably roughened surfaces. The web-like members may thereby be made, for example, of suitable synthetic resinous material whose surfaces in contact with the transmission elements 18, are suitably roughened by conventional means. These web-like members may then also be provided with a predetermined number of grooves or channels so as to separate from each other the axially spaced NITINOL transmission elements used to drive the wheel 11. However, since it is desirable to remove as much heat as possible from the transmission elements 18 while in contact with the wheel 11, at least the part or parts providing the circumferential contact surfaces for the transmission elements 18 should be made of material having good thermal conductivity properties.

Figure 9:
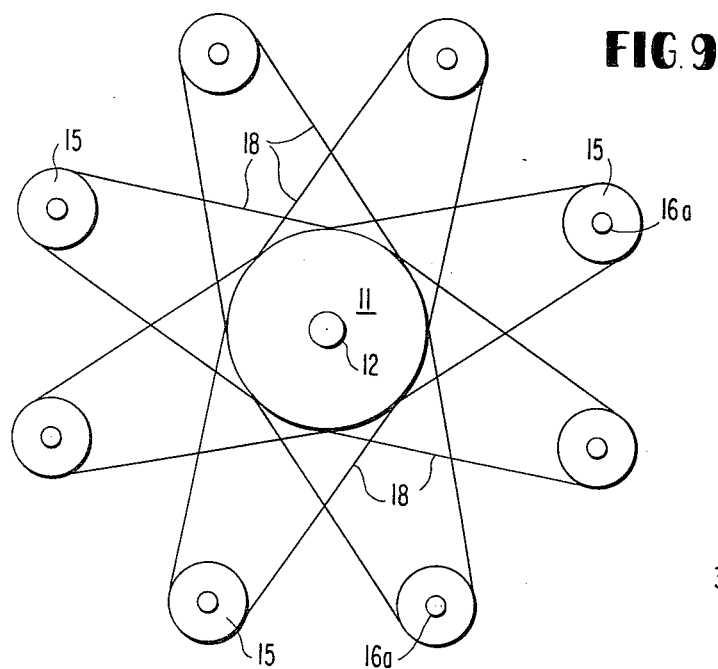
FIG. 9 is a schematic plan view on a modified embodiment of a thermal-mechanical device according to the present invention utilizing a number of hot wheels with one larger relatively cold wheel.

FIG. 9 illustrates an arrangement utilizing a number of circumferentially spaced "hot" wheels 15 cooperating with a single wheel 11 as may be required for the large-volume coolant of larger power plants where a large number of hot wheels would be required to remove the waste heat contained in the coolant. This large number of hot wheels is also due to the fact that the diameter of a hot wheel must be sufficiently small to assure adequate bending of the transmission element(s) about the same to produce a large force release. In that case, each wheel 15 is drivingly connected with the wheel 11 by way of its own endless NITINOL transmission element or elements 18 whereby the wheels 15 are spaced or offset in the axial direction so as to prevent interference of the transmission elements 18 of the respective wheels 15. Of course, the wheel 11 will then be made of an axial length equal to the effective axial length of the various wheels 15 as a result of their axial offset. In case the fluid medium is sufficiently clean to allow internal heat transfer, the wheels 15 may thereby be so-called "hot" wheels, whereby the heated fluid medium enters and leaves through the shafts 16.

A preferred embodiment in accordance with the present invention is illustrated in FIG. 10 in which a single larger wheel 11 supported on output shaft 12 rotatably supported in bearings 35 is connected with a single hot wheel 15 of the type illustrated in FIGS. 4 and 5 which is mounted on the hollow shaft sections 16a and 16b, rotatably supported in sealed bearings 40. The wheel 11 may be, for example, of the type shown in FIG. 6 or FIGS. 7 and 8 or may be of a construction similar to that of the smaller wheel 15, as shown in FIGS. 4 and 5, especially if the wheel 11 is to be cooled by the use of a coolant. Any desired number of NITINOL transmission elements 18 may thereby be used to obtain the desired output, depending only on the amount of thermal energy available. Furthermore, several hot wheels may be connected in series which cooperate respectively with NITINOL transmission elements whose transition temperatures decrease in the direction of flow of the fluid medium. This will permit to maximize the thermal energy to be converted into mechanical energy since the cooling of the fluid medium in the first hot wheel will not impair the operation of a following hot wheel or wheels, each cooperating with a predetermined number of NITINOL transmission elements having decreasingly lower transition temperatures.

The arrangement of FIG. 10 can be used, for example, in a cooling system of an internal combustion engine of a motor vehicle, in which at present the heat produced by the engine is completely wasted when given off to the surroundings by way of the radiator. As a matter of fact, the use of a thermal-mechanical energy converter in accordance with the present invention, will permit a considerable reduction in the size of the radiator and may ultimately permit the complete elimination of the need for such radiator by the conversion of the thermal energy in the coolant of the internal combustion engine into mechanical energy to drive the alternator and/or the compressor of the car's air-conditioning system. The output power obtainable is thereby dependent only on the temperature difference of the fluid medium at the inlet and outlet and the number of NITINOL transmission elements which can be used effectively in a thermal-mechanical device of the present invention. Similarly, the thermal energy contained in the exhaust gases of an internal combustion engine or at least a substantial portion thereof can be converted into useful mechanical energy by the thermal-mechanical energy devices in accordance with the present invention.

In the alternative, in case an external heat transfer is necessary because of impurities in the fluid medium, it is only necessary to conduct the fluid medium past the wheel 15 externally thereof to effect a transfer of thermal energy from the fluid medium to the wheel 15. This may be achieved by any known means such as a duct, channel, conduit, etc. schematically indicated in dash and dotted lines in FIG. 10 and designated by reference numeral 67. If the device is to be able to handle large amounts of fluid medium as may be the case in situations involving power plants, any number of such channels connected in parallel may be provided, each containing also a number of devices as shown in FIG. 10 which could then be connected in series as discussed above.

Moreover, the present invention will permit the recovery of substantial amounts of energy from the low-grade heat presently wasted in the cooling systems of nuclear power plants, in which the low-grade heat is dumped into rivers, lakes and the like. Furthermore, the solar energy may be effectively converted into mechanical energy by the devices of the present invention which are capable of efficiently converting the thermal energy of fluid media, such as, water, heated by the solar energy. Similarly, the temperature difference of water existing at different depths of the ocean, may also be used with the present invention as heat source. Moreover, the invention is equally applicable to waste heat contained in gaseous media, hence the term fluid medium is used herein to designate both gaseous and/or liquid media.

Thus, the present invention offers virtually unlimited possibilities to convert low-grade heat into mechanical energy by extremely simple means which involve low structural expenditures and obviate the need for large space requirements. Since the NITINOL material is practically without wear over long periods of time due to its hardness and wear charactertistics, the device according to the present invention additionally offers the advantage of long service life without the need of frequent servicing. Moreover, no expensive controls are required for the operation of the device in accordance with the present invention. Hence, the present invention is suitable in numerous applications.

It is also possible to utilize, in lieu of a number of NITINOL wires held at predetermined spacings by the use of grooves, channels, partitions, etc., a web-like band consisting of individual parallelly arranged NITINOL wires which are in effect held together at predetermined relatively close distances by the use of one or several weft-like, very thin wire members of suitable metal (e.g. stainless steel) or synthetic resinous material which extend cross-wise alternately in front of the first wire, behind the second wire and then again in front of the third wire of NITINOL material and so on, whereby each following row of weft-like members alternates with its preceding row so that weft-like members of successive rows pass alternately in front and behind a given transmission element. FIG. 11 illustrates somewhat schematically a web-like band consisting of several transmission elements 18 held in predetermined relationship by weft-like members 81. To minimize the impact of the presence of the weft-like members, it is only necessary to provide the weaving effect, i.e., the weft-like members, at suitably spaced intervals over the entire length of the endless NITINOL transmission elements used in a given device. Such a band-like arrangement is suitable, for example, with a wheel 15 as illustrated in FIG. 3, in which case the disk-like end members are spaced to form a channel of sufficient axial length to accommodate the band-like transmission structure. The weft-like members may extend substantially at right angle to the direction of movement of the transmission elements or also may extend at an angle thereto to form, for example, a zig-zag-like pattern.

The transmission elements, each made of NITINOL material, may be connected at their free ends in any known manner to form the endless structure. For example, the use of a short stainless steel tubing crimped over the free ends of a NITINOL wire proved satisfactory, though a preferred method is by welding together the free ends such as by electron beam welding.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A device for converting thermal energy into mechanical energy, comprising at least two rotatably supported wheel means, and endless transmission means of a material having a memory effect capable in the bending mode of converting thermal energy into mechanical energy when heated from a temperature below its transition temperature to a temperature above its transition temperature, said transmission means having a normal substantially rectilinear shape and operatively connecting with each other said wheel means to drive one of said wheel means by the other wheel means upon application of thermal energy to the transmission means, characterized in that the transmission means is bent from its normal substantially rectilinear configuration as it passes over said other wheel means and at the same time thermal energy is transferred from said other wheel means to said deformed transmission means over at least a major portion of the circumferential contact of said transmission means with said other wheel means to thereby cause said transmission means to revert to its normal substantially rectilinear shape.

2. A device according to claim 1, characterized in that the transmission means passes over a substantial part of the circumference of the one wheel means and is thereby deformed by bending about at least one axis extending substantially parallel to the axis of said one wheel means.

3. A device according to claim 2, characterized in that the one wheel means is relatively colder than said other wheel means, said other wheel means having at least an approximately uniform temperature over its circumferential surface.

4. A device according to claim 3, characterized in that said transmission means is of predetermined configuration in cross section with the twinning axes at least approximately uniaxially aligned in the direction of movement of said transmission means.

5. A device according to claim 4, characterized in that said transmission means is extruded so that the twinning axes thereof are substantially aligned uniaxially in the direction of movement of said transmission means.

6. A device according to claim 1, 2, 3, 4, or 5, characterized in that said material is made of an alloy containing at least nickel and titanium in proportions corresponding approximately to the stoichiometric ratio.

7. A device according to claim 3, characterized in that the diameter of the one wheel means is larger than that of the other wheel means.

8. A device according to claim 7, characterized in that a number of transmission elements spaced from one another in the axial direction are provided to drivingly interconnect the other wheel means with the one wheel means.

9. A device according to claim 8, characterized in that at least one hot wheel having a substantially constant temperature throughout its wheel body is formed by said other wheel means.

10. A device according to claim 9, characterized in that thermal energy is transferred to the other wheel means by a fluid medium.

11. A device according to claim 10, characterized in that the fluid medium containing thermal energy flows through each hot wheel.

12. A device according to claim 10, characterized in that the fluid medium containing thermal energy flows externally of the other wheel means in heat-transferring relationship therewith.

13. A device according to claim 10, characterized in that a number of hot wheels are series-connected with respect to the flow of said fluid medium.

14. A device according to claim 13, characterized in that the transition temperature of transmission elements of said transmission means decrease in the direction of flow of the fluid medium as the latter gives off thermal energy to the transmission elements of said transmission means.

15. A device according to claim 9, characterized in that the circumferential surface of a hot wheel is made of a material having good heat-conductivity characteristics and is provided with a number of axially spaced, circumferential channels to guide therein a respective transmission means.

16. A device according to claim 9, characterized in that the outer surface of the one wheel means is so constructed as to provide a number of axially spaced, circumferential channels to guide therein a respective transmission means.

17. A device according to claim 15, characterized in that the one wheel means is provided with means to increase the frictional contact thereof with said transmission means.

18. A device according to claim 9, characterized in that said other wheel means include a number of individual wheels, and a number of transmission means drivingly connecting a respective wheel with said one wheel means, said one wheel means being drivingly mounted on a shaft means providing a common output.

19. A device according to claim 18, characterized in that the wheels of said other wheel means are substantially coaxially arranged.

20. A device according to claim 18, characterized in that the wheels of said other wheel means are spaced about said one wheel means and are each drivingly connected with said one wheel means by a respective transmission means.

21. A device according to claim 20, characterized in that the wheels of said other wheel means are also mutually offset to one another in the axial direction of said one wheel means, and said one wheel means has an effective axial length corresponding at least approximately to the length of the overall offset of said wheels.

22. A device according to claim 3, characterized in that at least the other wheel means includes a number of wheels each supporting on the outer circumferential surface thereof a number of axially spaced wires.

23. A device according to claim 22, characterized in that the one wheel means includes a number of axially spaced, substantially coaxial wheels, and the other wheel means includes an equal number of axially spaced, substantially coaxial wheels, the wheels of the one wheel means being interconnected for rotation in unison, and one respective wheel each of the one and other wheel means being interconnected by respective transmission means.

24. A device according to claim 7, characterized by further means including a fluid medium for applying thermal energy to said other wheel means.

25. A device according to claim 24, characterized in that the fluid medium is in heat-transfer contact with external surface means of said other wheel means.

26. A device according to claim 25, characterized in that the fluid medium is in heat-transfer contact with internal surface means of the other wheel means.

27. A device according to claim 26, characterized in that each other wheel means is provided with cavity means therewithin to receive the fluid medium through inlet and outlet means in communication with said cavity means.

28. A device according to claim 27, characterized in that said inlet and outlet means extend substantially in the axial direction of the other wheel means.

29. A device according to claim 28, in which said other wheel means is supported on a hollow shaft means, at least a part of the inlet and outlet means for the fluid medium being formed by said hollow shaft means.

30. A device according to claim 29, characterized in that said hollow shaft means is rotatably supported by sealed bearing means and its interior is operatively connected with relatively fixed sections of the inlet and outlet means operatively connected with sealed bearing means.

31. A device according to claim 27 or 30, characterized in that guide means are provided in the cavity means to direct the flow of the fluid medium toward the circumferential surface of the other wheel means to enhance the transfer of thermal energy with the circumferential surface of the other wheel means.

32. A device according to claim 31, characterized in that additional means are provided which are operable to impart to the other wheel means a direction of rotation by flow of the fluid medium.

33. A device according to claim 32, characterized by means for cooling the circumferential surface of the one wheel means.

34. A device according to claim 27, characterized in that additional means are provided inside the other wheel means to impart to the latter a preferred direction of rotation by a flow of the fluid medium therethrough.

35. A device according to claim 1, 2, 3, 4 or 5, characterized in that the one wheel means is provided with means to increase the frictional contact of its circumferential surface means with the transmission means.

36. A device according to claim 35, characterized in that the one wheel means includes means providing an enhanced cooling effect on the circumferential surface means thereof.

37. A device according to claim 8, characterized in that a number of said transmission elements are held together at predetermined mutual spacings by a number of weft-like members alternately passing in a given row in front and behind adjacent transmission elements and also passing alternately in front and behind a given transmission element in alternate rows thereof.

38. A device according to claim 37, characterized in that said weft-like members are provided only at predetermined locations of the length of the transmission elements.

* * * * *